(12) United States Patent
Furui

(10) Patent No.: US 6,652,001 B2
(45) Date of Patent: Nov. 25, 2003

(54) PASSIVE SAFETY DEVICE FOR VEHICLE

(75) Inventor: Takashi Furui, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 32 days.

(21) Appl. No.: 10/077,892

(22) Filed: Feb. 20, 2002

(65) Prior Publication Data
US 2003/0038464 A1 Feb. 27, 2003

(30) Foreign Application Priority Data
Aug. 24, 2001 (JP) ........................................ 2001-254819

(51) Int. Cl.⁷ .............................................. B60R 21/01
(52) U.S. Cl. ........................ 280/735; 701/45; 307/10.1; 340/438
(58) Field of Search ........................ 280/735; 307/10.1; 701/45; 340/438

(56) References Cited

U.S. PATENT DOCUMENTS 5,638,274 A * 6/1997 Konishi et al. ............. 280/735

FOREIGN PATENT DOCUMENTS

| DE | 39 13 628 A1 | 11/1989 | | |
|---|---|---|---|---|
| DE | 196 14 365 A1 | 10/1996 | | |
| DE | 690 25 177 T2 | 11/1996 | | |
| DE | 196 44 858 A1 | 5/1997 | | |
| JP | 08188113 A * | 7/1996 | ........... | B60R/21/32 |
| JP | 9-226514 | 9/1997 | | |
| JP | 9-229976 | 9/1997 | | |
| JP | 10071926 A * | 3/1998 | ........... | B60R/21/32 |
| JP | 11-85221 | 3/1999 | | |

* cited by examiner

Primary Examiner—Peter C. English
(74) Attorney, Agent, or Firm—Sughrue Mion, PLLC

(57) ABSTRACT

When an on-board power source is turned off, after a predetermined time has elapsed, a microcomputer 34 writes predetermined data in a nonvolatile memory 35, and when the on-board power source is turned on, the microcomputer 34 judges whether the predetermined data is written in the nonvolatile memory 35 or not. If the judgment shows that the predetermined data is not written in the nonvolatile memory 35, the microcomputer 34 determines a backup capacitor 32 not to be working normally. The predetermined time is shorter than the operating time of the microcomputer 34 determined by the discharge time of the backup capacitor when the backup capacitor is working normally, and is longer than the operating time of the microcomputer 34 determined by the discharge time of the backup capacitor when the backup capacitor is not working normally.

10 Claims, 4 Drawing Sheets

PASSIVE SAFETY DEVICE FOR VEHICLE

BACKGROUND OF THE INVENTION

1. Field of the Invention

The present invention relates to a passive safety device for a vehicle having a safety unit such as an air bag or the like, and especially, to a backup capacitor capacity detecting device for detecting the capacity of a backup capacitor used for the passive safety device for a vehicle.

2. Description of the Related Art

In general, a passive safety device for a vehicle for protecting a passenger by filling out an air bag or the like when a vehicle collides with something is provided with a backup capacitor for the purpose of actuating the passive safety device for a vehicle even if a vehicle battery is brought in an unusable state by a break of a wire in the occurrence of collision. In order to successfully actuate the passive safety device for a vehicle by the backup capacitor, it is necessary to check whether the capacity of the backup capacitor (amount of charge) is working normally or not. For this reason, a conventional passive safety device for a vehicle is provided with a backup capacitor capacity detecting unit.

As a backup capacitor capacity detecting unit as above, for example, a "capacitor capacity diagnosing circuit" disclosed in Japanese Patent Publication No. 9-229976 is known.

FIG. 5 is a block diagram showing a conventional backup capacitor capacity detecting unit used for conventional passive safety device for a vehicle. Referring to FIG. 5, a reference numeral 1 denotes an on-board battery; a reference numeral 2 an ignition switch; a reference numeral 10 a reverse current blocking diode; a reference numeral 11 a processing circuit; a reference numeral 12 a switching transistor; a reference numeral 31 a power source circuit; and a reference numeral 32 a backup capacitor. The power source circuit 31 is, for example, a DC—DC converter for boosting the voltage of the on-board battery 1 to a predetermined one. The reverse current blocking diode blocks flowing of charges accumulated in the backup capacitor 32 into the power source circuit 31 in the occurrence of a failure of the power source circuit 31. The processing circuit 11 diagnoses the failure of the backup capacity, as described below.

Next, the operation of the conventional backup capacitor capacity detecting unit will be described.

When the ignition switch 2 is closed, the on-board battery 1 is charged up by charges migrated from the backup capacitor 32 via the power source circuit 31. In making a diagnose the capacity of the backup capacitor 32, it is enough to turn on the switching transistor 12, which discharges the charges accumulated in the backup capacitor 32 via a resistor R2 and the switching transistor 12. On the other hand, the terminal voltage of the backup capacitor 32 is applied to the processing circuit 11 by dividing the terminal voltage by resistors R3 and R4. Thus, the processing circuit 11 measures a voltage drop caused by the discharge of the backup capacitor 32 and detects the capacity (amount of charge) of the backup capacitor 32 based on the voltage drop.

A backup capacitor capacity detecting unit for a conventional passive safety device for a vehicle is configured in the manner described above. Thus, when detecting the capacity of the backup capacitor, a switching transistor needs to be turned on to forcibly discharge the backup capacitor, which precludes the use of the backup capacitor in the course of the detection of the capacity of the backup capacitor.

Further, the conventional passive safety device for a vehicle is separately provided with the backup capacitor capacity detecting unit. In other words, it demands a switching transistor and a processing circuit for detecting the capacity of the backup capacitor, and thus the cost of the passive safety device for a vehicle will be expensive.

SUMMARY OF THE INVENTION

The present invention has been made to solve the above problems described above, and an object of the present invention is to provide a passive safety device for a vehicle, which is able to use a backup capacitor even in the course of the detection of the capacity of the backup capacitor. Another object of the present invention is to provide an inexpensive passive safety device for a vehicle.

A passive safety device for a vehicle according to the present invention comprises a passive safety unit for protecting a passenger ridden in a vehicle; an ignition circuit, connected to an on-board power source, for applying an operating current to the passive safety unit to actuate the passive safety unit; a backup capacitor, connected to the on-board power source and the ignition circuit, for applying the operating current to the passive safety unit when the ignition circuit is disconnected from the on-board power source; a control part, connected to the on-board power source via the backup capacitor, for controlling the ignition circuit; and a nonvolatile memory in which failure diagnosis information is stored, wherein the control part has first means for writing predetermined data in the nonvolatile memory after a predetermined time has elapsed when the on-board power source is turned off; and second means for reading the predetermined data written in the nonvolatile memory, when the on-board power source is turned on, for judging whether the predetermined data is written in the nonvolatile memory or not, and for determining the backup capacitor not to be working normally if the judgement shows that the predetermined data is not written in the nonvolatile memory.

In the passive safety device for a vehicle according to the present invention, the predetermined time is shorter than the operating time of the control part defined by the discharge time of the backup capacitor when the backup capacitor is working normally, and is longer than the operating time of the control part defined by the discharge time of the backup capacitor when the backup capacitor is not working normally.

In the passive safety device for a vehicle according to the present invention, the predetermined time is determined on the basis of a result obtained by measuring the operating time of the control part of each device, and is written in the nonvolatile memory.

A passive safety device for a vehicle according to the present invention comprises a passive safety unit for protecting a passenger ridden in a vehicle; an ignition circuit, connected to an on-board power source, for applying an operating current to the passive safety unit to actuate the passive safety unit; a backup capacitor, connected to the on-board power source and the ignition circuit, for applying the operating current to the passive safety unit when the ignition circuit is disconnected from the on-board power source; a control part, connected to the on-board power source via the backup capacitor, for controlling the ignition circuit; and a nonvolatile memory in which failure diagnosis information is stored, wherein first data and second data different from the first data are written previously as initial values in the nonvolatile memory, and wherein the control part has first means for comparing the first data with the second data, when the on-board power source is turned on, and for judging the backup capacitor not to be working normally, if the first data coincides with the second data, and for applying a predetermined processing to the first data to make the first data equal to the second data and for writing the first data in the nonvolatile memory; and second means for applying a predetermined processing to the second data after a predetermined time has elapsed to make the first data unequal to the second data, when the on-board power source is turned off and for writing the second data in the nonvolatile memory.

In the passive safety device for a vehicle according to the present invention, the predetermined time is shorter than the operating time of the control part defined by the discharge time of the backup capacitor when the backup capacitor is working normally, and is longer than the operating time of the control part defined by the discharge time of the backup capacitor when the backup capacitor is not working normally.

In the passive safety device for a vehicle according to the present invention, the first data and the second data have the same bit length, and wherein the first means and the second means rotate the first data and the second data by a predetermined number of bits, respectively.

In the passive safety device for a vehicle according to the present invention, the first data is equal to ½ of the second data, and wherein the predetermined number of bits is one.

In the passive safety device for a vehicle according to the present invention, the first data has a plurality of first comparing data and the second data has a plurality of second comparing data, each corresponding to the first comparing data, and wherein the first means and the second means perform a predetermined processing for each of the first comparing data and the second comparing data, respectively, and wherein the first means compares the first data with the second data for each of the first comparing data and the second comparing data, and judges the backup capacitor not to be working normally if the judgement shows that the number of comparing data coincided with each other surpasses a predetermined number.

In the passive safety device for a vehicle according to the present invention, the first means judges the backup capacitor not to be working normally if the first data and the second data written in the nonvolatile memory coincide with each other as many as a predetermined number of times.

In a passive safety device for a vehicle according to the present invention, the predetermined time is determined on the basis of a result obtained by measuring the operating time of the control part for each device, and is written in the nonvolatile memory.

The above and other objects and the attendant advantages of the invention will become readily apparent by referring to the following detailed description o f the preferred embodiments when considered in conjunction with the accompanying drawings.

BRIEF DESCRIPTION OF THE DRAWINGS

Throughout the figures, the same reference numerals, and characters, unless otherwise noted, are used to denote like features, elements, components, or portions of the illustrated embodiments.

DESCRIPTION OF PREFERRED EMBODIMENTS OF THE INVENTION

The preferred embodiments of the present invention will be described below in detail with reference to accompanying drawings.

FIRST EMBODIMENT

Figure 1:
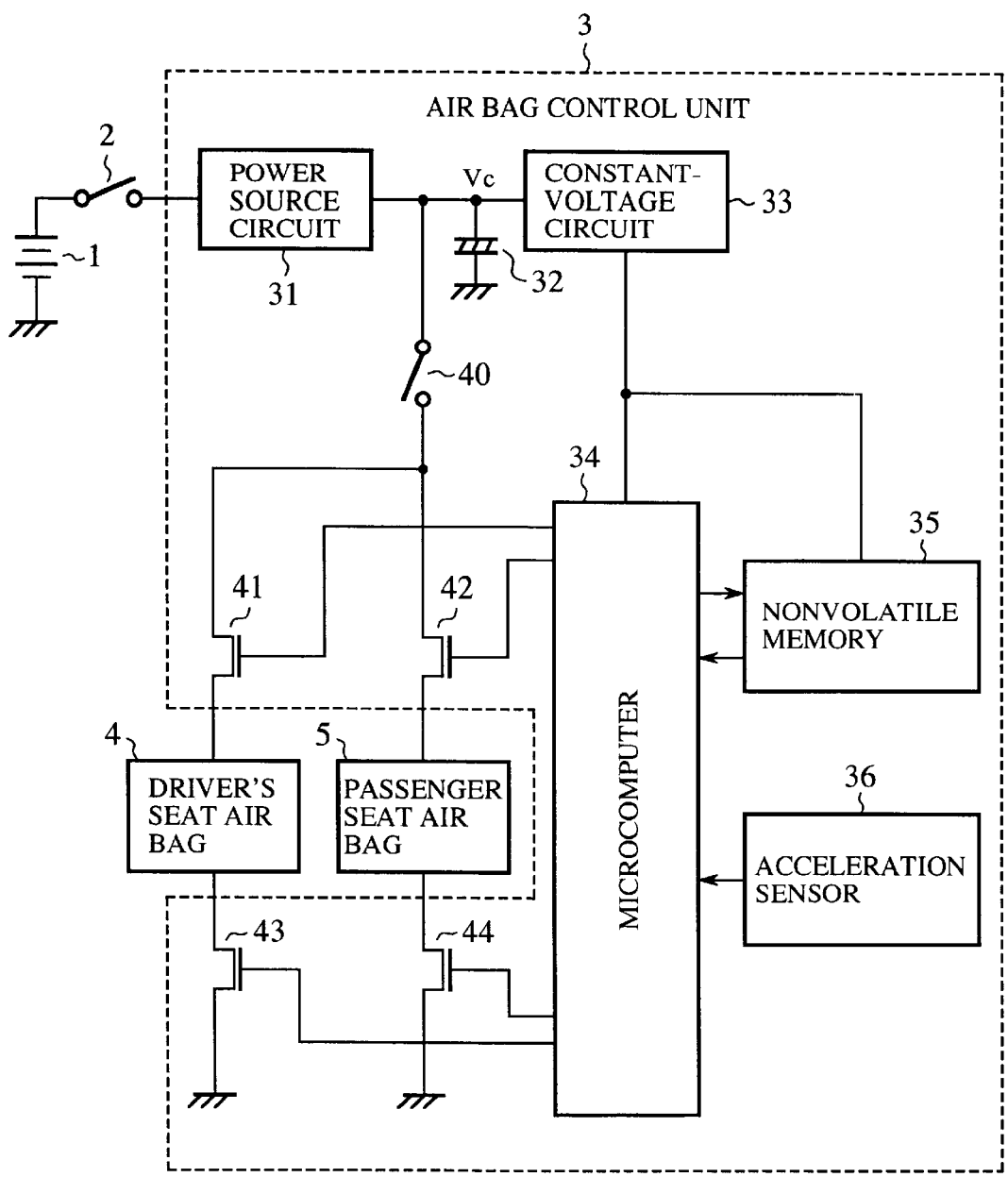
FIG. 1 is a circuit diagram showing a passive safety device for a vehicle according to a first embodiment of the present invention.

FIG. 1 is a circuit diagram showing a passive safety device for a vehicle according to the first embodiment of the present invention. Referring to FIG. 1, a reference numeral 1 denotes an on-board battery; a reference numeral 2 an ignition switch; a reference numeral 3 an air bag control unit; a reference numeral 4 a driver's seat air bag (passive safety unit); and a reference numeral 5 a passenger seat air bag (passive safety unit). In FIG. 1, the air bag control unit 3, the driver's seat air bag 4 and the passenger seat air bag 5 constitute a passive safety device for a vehicle. The air bag control unit 3 includes a power source circuit (DC—DC converter) 31, a backup capacitor 32, a constant-voltage circuit 33, a microcomputer (control part) 34, a nonvolatile memory 35, an acceleration sensor 36, a mechanical acceleration sensor (G) 40 for a fail-safe operation, and switching transistors 41 to 44. The backup capacitor 32 is charged by a voltage applied by the power source circuit 31. The constant-voltage circuit 33 makes the voltage supplied by the power source circuit 31 a constant and becomes a constant-voltage source for the microcomputer 34 and the nonvolatile memory 35.

The microcomputer 34 controls the operation of the driver's seat air bag 4 and the passenger seat air bag 5 and makes a failure diagnosis of the whole passive safety device for a vehicle, and further detects the capacity of the backup capacitor 32. The nonvolatile memory 35 stores information concerning the failure diagnosis (for example, results of failure diagnosis of the ignition circuit of the air bag). The acceleration sensor 36 measures an acceleration applied to the vehicle and supplies the measured acceleration to the microcomputer 34 as a detected one. Here, in FIG. 1, the ignition circuit is configured by the mechanical G sensor 40 and switching transistors 41 to 44.

Next, the operation of the first embodiment will be described.

Assuming that a vehicle happens to collide with something, the mechanical G sensor 40 is turned on. On the other hand, when the microcomputer 34 judges by a detected acceleration (acceleration waveform) supplied from the acceleration sensor 36 that the vehicle collides with something, the microcomputer 34 turns on switching transistors 41 to 44 (for example, when a collision applies an excessive acceleration to the vehicle and the acceleration detected by the acceleration sensor 36 exceeds a predetermined level, the microcomputer 34 turns on the switching transistors 41 to 44). In this manner, an electric current flows from the power source circuit 31 to the driver's seat air bag 4 through the switching transistors 41 and 43 to fill out the driver's seat air bag 4. Similarly, an electric current flows from the power source circuit 31 to the passenger air bag 5 through the switching transistors 42 and 44 to fill out the passenger air bag 5.

Unfortunately, if the on-board battery 1 is brought in an unusable state by a break of a cable or the like in the occurrence of collision, a discharge current from the backup capacitor 32 flows to the constant-voltage circuit 33, and as described above, the microcomputer 34 turns on the switching transistors 41 to 44 to apply the discharge current from the backup capacitor 32 to the driver's seat air bag 4 and the passenger seat air bag 5.

Next, the way to detect the capacity of the backup capacitor 32 will be described with reference to FIG. 2 and FIG. 3.

Figure 2:
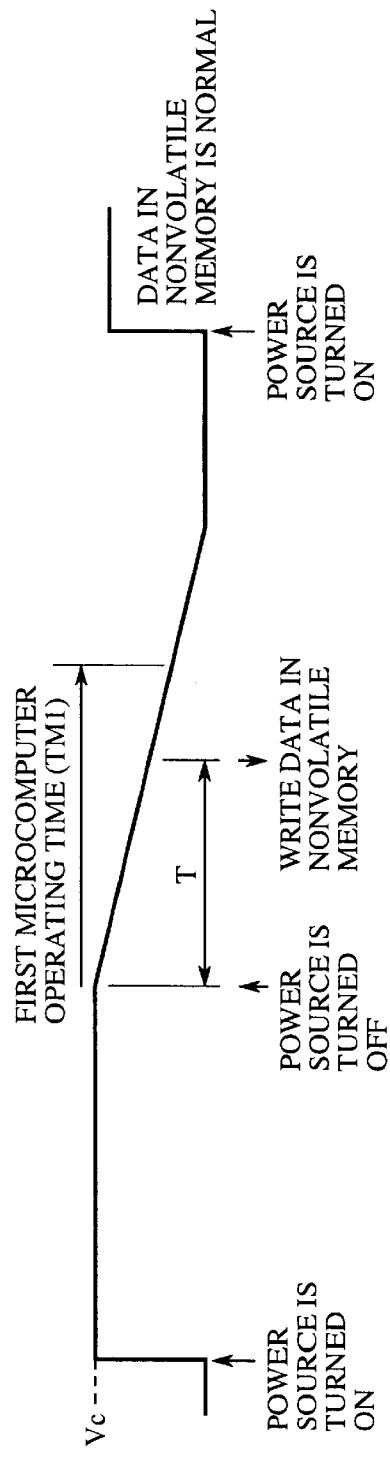
FIG. 2 is a diagram showing a change in a terminal voltage when a backup capacitor is working normally in the passive safety device for a vehicle shown in FIG. 1.

FIG. 2 is a diagram showing a change in a terminal voltage with an elapse of time when a backup capacitor is working normally in the passive safety device for vehicle shown in FIG. 1. In FIG. 1 when the ignition switch 2 is turned on, that is, a power source is turned on, the terminal voltage of the backup capacitor 32 becomes Vc. When the power source is turned off, the backup capacitor 32 starts to discharge and gradually drops its terminal voltage from Vc. As described above, a constant voltage is applied to the microcomputer 34 and the nonvolatile memory 35 from the constant-voltage circuit 33, and after the power source is turned off, the constant voltage is applied to the microcomputer 34 and the nonvolatile memory 35 from the constant-voltage circuit 33 based on the terminal voltage of the backup capacitor 32.

When the terminal voltage is less than the constant voltage, that is, the terminal voltage is less than a predetermined one, the constant voltage is not applied to the microcomputer 34, and the microcomputer 34 gets into an inoperable state. In other words, if the backup capacitor 32 is working normally, it requires a long time till the terminal voltage drops less than the predetermined one and thus the operating time of the microcomputer 34 is prolonged after the power source is turned off. For this reason, before a predetermined time T which is shorter than the operating time of the microcomputer 34 and after the power source is turned off (the operating time of the microcomputer 34 when the backup capacitor 32 is working normally is referred to as the first microcomputer operating time), the microcomputer 34 can write predetermined data in the nonvolatile memory 35.

Figure 3:
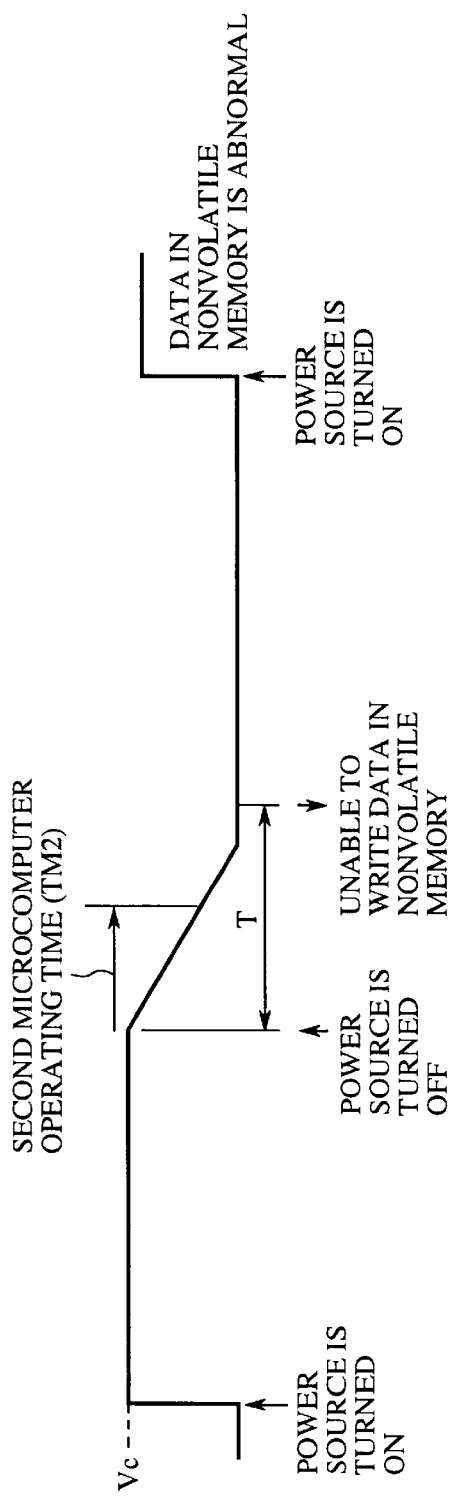
FIG. 3 is a diagram showing a change in a terminal voltage when a backup capacitor is not working normally in the passive safety device for a vehicle shown in FIG. 1.

FIG. 3 is a diagram showing a change in a terminal voltage with an elapse of time when a backup capacitor is not working normally in the passive safety device for a vehicle shown in FIG. 1. The terminal voltage shows the same behavior as in FIG. 2 till the power source is turned off, and if the backup capacitor 32 is not working normally, the time that the terminal voltage takes till it drops less than the predetermined voltage is less than in FIG. 2. This shortens the operating time of the microcomputer 34 as compared with that of the microcomputer 34 when it is working normally (the operating time of the microcomputer 34 when the backup capacitor 32 is not working normally is referred to as the second microcomputer operating time). Here, the predetermined time T is set to a value longer than the second microcomputer operating time. In other words, letting the first microcomputer operating time be TM1 and the second microcomputer operating time be TM2, the predetermined time T is set to satisfy the relationship of TM2<T<TM1.

When the power source is turned off, the microcomputer 34 writes predetermined data in the nonvolatile memory 35 after the predetermined time T has elapsed. At this time, if the backup capacitor 32 is not working normally, after the predetermined time T has elapsed, the microcomputer 34 is in an inoperable state and thus cannot write the predetermined data in the nonvolatile memory 35. In contrast, if the backup capacitor 32 is working normally, after the predetermined time T has elapsed, the microcomputer 34 is in an operable state and thus can write the predetermined data in the nonvolatile memory 35. Thereafter, if the power source is turned on again, the microcomputer 34 accesses the nonvolatile memory 35 and reads the predetermined data.

As a result, after the power source is turned on again, when the microcomputer 34 accesses the nonvolatile memory 35 and if it can read the predetermined data, the microcomputer 34 judges the backup capacitor 32 to be working normally, otherwise, the microcomputer 34 judges the backup capacitor 32 not to be working normally.

As mentioned above, according to the first embodiment, with the microcomputer and the nonvolatile memory mounted on the passive safety device for the vehicle, after the power source is turned off and the predetermined time has elapsed, the microcomputer writes the predetermined data in the nonvolatile memory, and after the power source is turned on again, the microcomputer checks whether the predetermined data is written in the nonvolatile memory or not and judges whether the backup capacitor is working normally or not based on the checked results. This enables the microcomputer to make a check whether the backup capacitor is working normally or not, without adding a device such as a processing unit or the like, and thus hardly increases the cost of the passive safety device for the vehicle itself.

In addition, according to the first embodiment, when the power source is turned off, the vehicle is in a stopped state, so that the backup capacitor can be used in the course of the detection of the capacity of the backup capacitor.

SECOND EMBODIMENT

Figure 4:
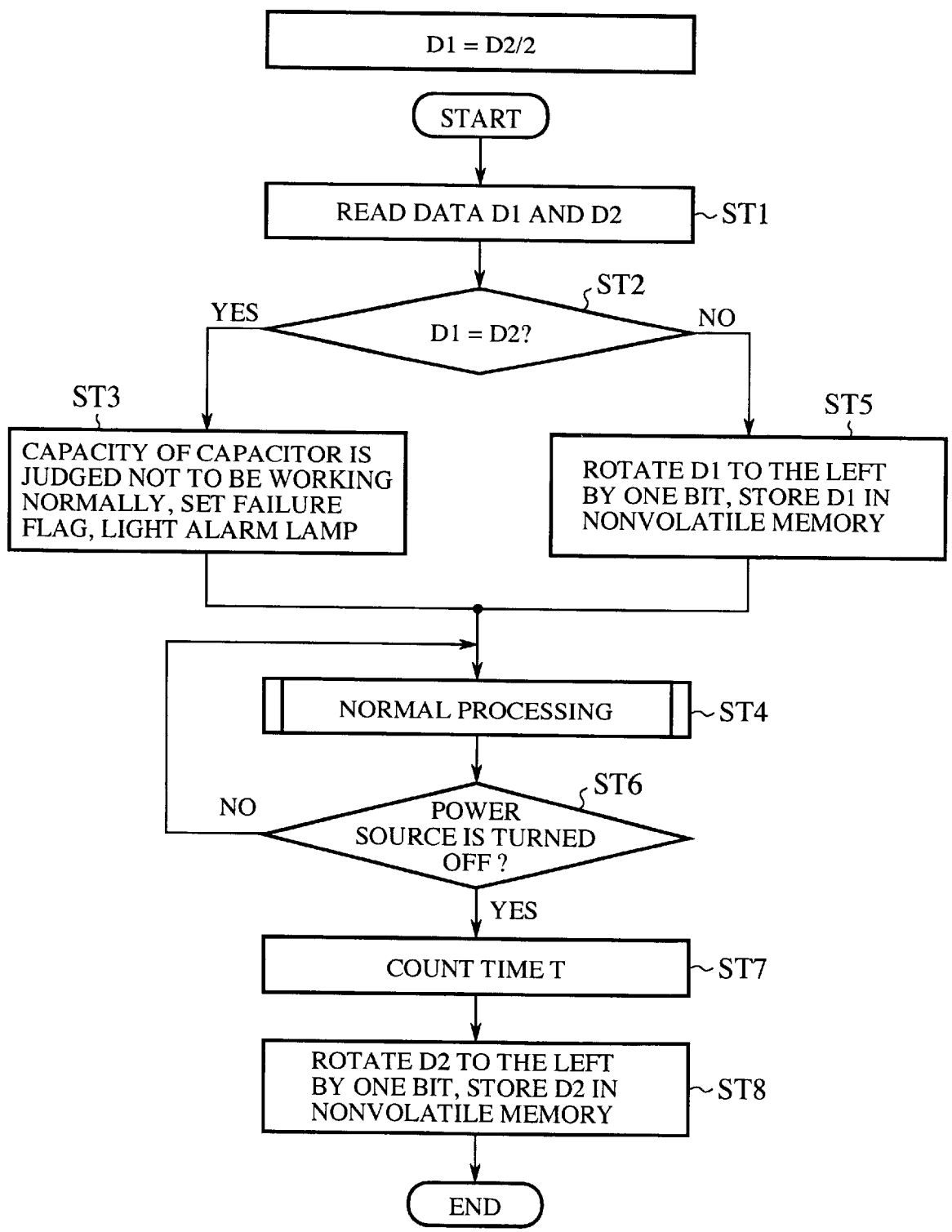
FIG. 4 is a flowchart for explaining an operation of a passive safety device for a vehicle according to a second embodiment of the present invention.
Figure 5:
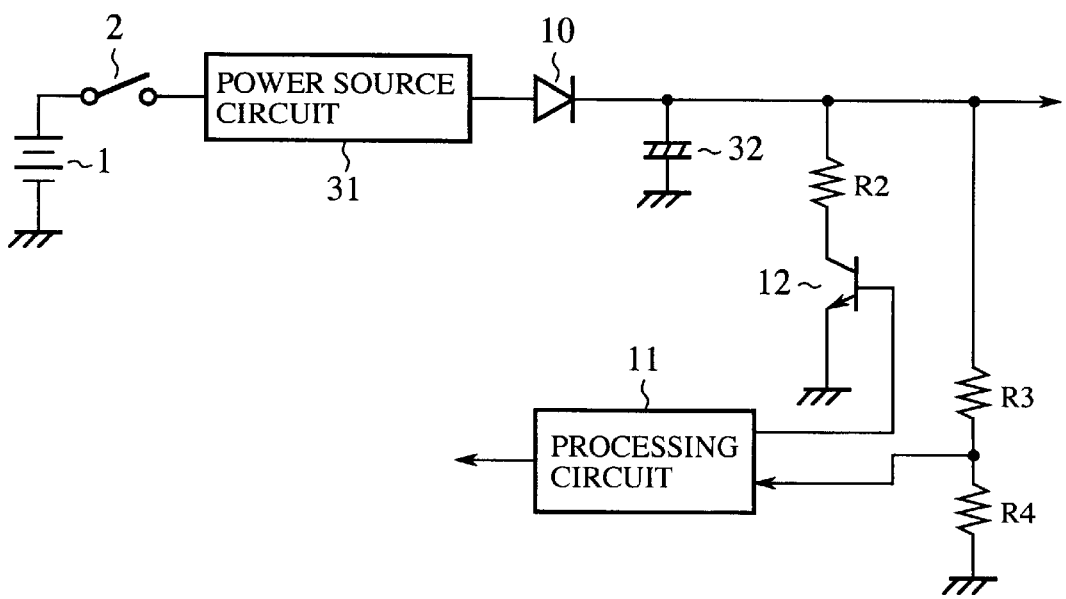
FIG. 5 is a circuit diagram showing a backup capacitor capacity detecting unit used for a conventional passive safety device for a vehicle.

FIG. 4 is a flow chart for explaining a passive safety device for a vehicle according to the second embodiment of the present invention. In FIG. 4, assume that a first data D1 and a second data D2. are written as the initial values in the nonvolatile memory 35, where D1 equals D2 divided by two (D2/2).

When the power source is turned on (start), the microcomputer 34 reads the first data D1 and the second data D2 from the nonvolatile memory 35 (step ST1) and compares the first data D1 with the second data D2 (step ST2). As a result, if the first data D1 coincides with the second data D2 (here, since the first data D1 which is equal to the second data D2 divided by two is written in the nonvolatile memory 35, when the power source is initially turned on, the first data D1 is not equal to the second data D2), the microcomputer 34 judges the backup capacitor not to be working normally, sets a failure flag in the nonvolatile memory 35, and lights an alarm lamp (not shown) (step ST3). Thereafter, the microcomputer 34 proceeds to the step ST4.

On the other hand, if the first data D1 does not coincide with the second data D2 at the step ST2, the microcomputer 34 rotates (bit shift) the first data D1 to the most significant bit (to the left) by one bit and after the rotating operation stores the new first data D1 in the nonvolatile memory 35 (step ST5). Then, the microcomputer 34 proceeds to the step ST4.

The microcomputer 34 performs the ordinary processing such as failure diagnosis of the passive safety device for the vehicle itself at the step ST4 till the power source is turned off. When the power source is turned off (step ST6), the microcomputer 34 counts the predetermined time T illustrated in FIG. 2 and FIG. 3 (step ST7) and rotates the second data D2 to the left by one bit and after the rotating operation stores the new second data D2 in the nonvolatile memory 35 (step ST8). Then, the microcomputer 34 finishes the processing.

When the power source is turned on again, the microcomputer 34 checks whether the backup capacitor 32 is working normally or not. At that time, the new first data D1 and the new second data D2 are read from the nonvolatile memory 35 and are compared with each other.

In this manner, initially the first data D1 and the second data D2 are written in the nonvolatile memory 35. Since the first data D1 equals the second data D2 divided by two, when the on-board power source is initially turned on, the first data D1 is not equal to the second data D2. As a result, the microcomputer 34 executes the step ST5. At that time, since the first data D1 initially equals the second data D2 divided by two, the new first data D1 obtained by rotating the first data D1 becomes equal to the second data D2.

Then, when the power source is turned off, after the predetermined time T has elapsed, the microcomputer 34 rotates the second data D2 and stores the rotated second data as the new second data D2 in the nonvolatile memory 35. However as described in the first embodiment, if the backup capacitor 32 is not working normally, the microcomputer 34 cannot perform a writing operation, that is, cannot write the new second data D2 (in other words, the second data D2 remains as it is as initially in the nonvolatile memory 35).

Thereafter, when the power source is turned on again, the microcomputer 34 reads the first data D1 and second data D2 from the nonvolatile memory 35 and compares them. If the backup capacitor 32 is not working normally, the the second data D2 is equal to the first data D3 and thus the microcomputer 34 executes the step ST3. Here, as described above, the first data D1 is rotated every time the power source is turned on, and the second data D2 is rotated after the predetermined time has elapsed after the power source is turned off. Thus, the two data stored in the nonvolatile memory become equal to each other at the time the backup capacitor 32 is not working normally.

In this manner, the first data D1 and the second data D2 are written as the initial values in the nonvolatile memory 35 and when the power source is turned on, the first data D1 is rotated by one bit and stored in the nonvolatile memory 35 (when the power source is initially turned on, the first data D1 is not equal to the second data D2, and thus, when the power source is turned on, the microcomputer 34 rotates the first data D1 by one bit and stores the rotated first data D1 in the nonvolatile memory). When the power source is turned off, after the predetermined time T has elapsed, the microcomputer 34 rotates the second data D2 and stores the rotated second data D2 in the nonvolatile memory 35. Thus, if the backup capacitor 32 is not working normally, the two data stored in the nonvolatile memory 35 are equal to each other, thereby detecting the abnormality occurred in the backup capacitor 32.

As mentioned above, according to the second embodiment, the first data D1 and the second data D2 are solely written as the initial values in the nonvolatile memory, and they are rotated by one bit every time the power source is turned on and off, respectively, and are stored in the nonvolatile memory. This allows the microcomputer to make a check whether the backup capacitor is working normally or not, without adding a component such as a processing unit or the like and hardly increases the cost of the passive safety device for the vehicle.

Further, according to the second embodiment, when the power source is turned of, the vehicle is in a stopped state, so that the backup capacitor can be used in the course of the detection of the capacity of the backup capacitor.

While in the second embodiment, the first data D1 and second data D2 are written as the initial values in the nonvolatile memory, a plurality of data (first comparing data) may be written in place of the first data D1 and a plurality of data (second comparing data) may be written in place of the second data D2. For example, comparing data A1 to AN may be written in place of the first data D1 and comparing data B1 to BN may be written in place of the second data D2 (where N is an integer of 2 or more). At this time, each of the comparing data A1 to AN is set to ½ of each of the comparing data B1 to BN. As described above, the microcomputer 34 compares the comparing data A1 to AN with the comparing data B1 to BN and rotates them. If it proved by the comparison that the number of coincided data surpasses a predetermined one, the microcomputer 34 judges the backup capacitor 32 not to be working normally.

As mentioned above, a fail-safe function can be added to the bit error of the nonvolatile memory by judging the abnormality occurred in the backup capacitor on the basis of the plurality of comparing data.

Further, in the second embodiment, when the two data written in the nonvolatile memory coincide with each other, the microcomputer 34 judges the backup capacitor 32 not to be working normally, in other words, once the two data written in the nonvolatile memory 35 coincide with each other, the microcomputer 34 judges the backup capacitor 32 not to be working normally. However, in the case of only one comparison, for example, the backup capacitor 32 might be judged not to be working normally by a voltage drop or a temporary reset caused by an igniting current. To avoid such a drawback, it is also recommended that when the two data written in the nonvolatile memory 35 coincide with each other at least two times (a predetermined number of times), the microcomputer 34 judges the backup capacitor 32 not to be working normally. This prevents the misjudgment that an instantaneous voltage drop or the like is judged to be the abnormality occurred resulting from the backup capacitor.

As mentioned above, the time T is predetermined in the first and second embodiments, but if the time T is evenly set, variations in consumed current or output voltage of the power source circuit 31 may bring on a change in the operating time of the microcomputer after the power source is turned off. Therefore, when determining the time T, it is necessary to consider the above variations. If the above variations are out of consideration when determining the time T. sometimes, the abnormality occurred in the backup capacitor could not be detected with high accuracy.

For this reason, when manufacturing the air bag control unit 3, the operating time of each microcomputer 34 is measured and the time T is determined based on the measured operating time. This time T is written as a set time in the nonvolatile memory 35. The microcomputer 34 writes data in the nonvolatile memory after the set time T has elapsed, which is written in the nonvolatile memory 35.

This cancels variations in the operating time of the microcomputer caused by the above-described variations and makes it possible to correctly understand the time-varying capacity of the capacitor.

EFFECT OF THE INVENTION

As mentioned above, according to the present invention, when the on-board power source is turned off, the control part writes the predetermined data in the nonvolatile memory after the predetermined time has elapsed; and when the on-board power source is turned on, the control part reads the predetermined data written in the nonvolatile memory and judges whether the predetermined data is written in the nonvolatile memory or not, and if the judgement shows that the predetermined data is not written in the nonvolatile memory, the control part determines the backup capacitor not to be working normally. Thus, the present invention can check whether the backup capacitor is working normally, without adding a component such as a processing unit or the like, and thus does not increase the cost of the passive safety device for the vehicle itself. Further, when the power source is turned off, the vehicle is in a stopped state, so that the backup capacitor can be used in the course of the detection of the capacity of the backup capacitor.

According to the present invention, the first data and the second data different from the first data are written as the initial values in the nonvolatile memory, and when the on-board power source is turned on, the control part compares the first data with the second data, and if they coincide with each other, the control part judges the backup capacitor not to be working normally, otherwise, the control part applies a predetermined processing to the first data to make the first data equal to the second data and writes it in the nonvolatile memory; and when the on-board power source is turned off, after the predetermined time has elapsed, the control part applies the predetermined processing to the second data to make the first data unequal to the second data and writes it in the nonvolatile memory. This ensures reliable detection of the abnormality occurred in the backup capacitor every time the on-board power source is turned on and off. Further, this checks whether the backup capacitor is working normally or not, without adding a component such as a processing unit or the like, and does not increase the cost of the passive safety device for the vehicle itself. Still further, when the power source is turned off, the vehicle is in a stopped state, so that the backup capacitor can be used in the course of the detection of the capacity of the backup capacitor.

According to the present invention, the first data has a plurality of first comparing data and the second data has a plurality of second comparing data, each corresponding to the first comparing data, and the control part applies a predetermined processing to each of the first and second comparing data and compares the first data with the second data for each of the first and second comparing data, and if the number of comparing data coincided with each other surpasses a predetermined number, the control part judges the backup capacitor not to be working normally. Thus, the present invention improves redundancy to the bit error of the nonvolatile memory.

According to the present invention, the control part judges the backup capacitor not to be working normally if the first data and second data written in the nonvolatile memory coincide with each other as many as a predetermined number of times. Thus, the present invention prevents the misjudgment caused by an external disturbance such as an instantaneous voltage drop or the like and thus ensures reliable judgement whether the backup capacitor is working or not.

According to the present invention, the predetermined time is determined for each device based on a result obtained by measuring the operating time of the control part, and is written in the nonvolatile memory. Thus, the present invention cancels errors caused by variations in the consumed current and thus reliably judges whether the backup capacitor is working normally or not with high accuracy.

While, in the above preferred embodiments of the invention, the passive safety device for the vehicle is given as an example, it should be understood by those skilled in the art that various modifications and changes may be made without departing from the sprit and scope of the invention.

Also, it should be noted that the invention meets all the objects mentioned above and also has the advantages of wide commercial utility, and that the invention has been set forth for purposes of illustration only and not of limitation. That is, the invention is limited only by the following claims which follow. Consequently, reference should be made to the following claims in determining the full scope of the invention.

What is claimed is:

1. A passive safety device for a vehicle, comprising:
    a passive safety unit for protecting a passenger in a vehicle;
    an ignition circuit, connected to an on-board power source, for applying an operating current to said passive safety unit to actuate said passive safety unit;
    a backup capacitor, connected to the on-board power source and said ignition circuit, for applying the operating current to said passive safety unit when said ignition circuit is disconnected from the power source;
    a control part, connected to the on-board power source and the backup capacitor, for controlling said ignition circuit; and
    a nonvolatile memory in which failure diagnosis information is stored,
    wherein said control part has first means for writing predetermined data in said nonvolatile memory after a predetermined time has elapsed when the on-board power source is turned off; and second means for reading the predetermined data written in said nonvolatile memory, when the on-board power source is turned on, for judging whether the predetermined data is written in said nonvolatile memory or not, and for determining said backup capacitor not to be working normally if the judgement shows that said predetermined data is not written in said nonvolatile memory.

2. The passive safety device for a vehicle according to claim 1, wherein said predetermined time is shorter than an operating time of said control part defined by a discharge time of said backup capacitor when said backup capacitor is working normally, and is longer than an operating time of said control part defined by the discharge time of said backup capacitor when said backup capacitor is not working normally.

3. The passive safety device for a vehicle according to claim 2, wherein said predetermined time is determined by measuring the normal operating time of said control part, and is written in said nonvolatile memory.

4. A passive safety device for a vehicle, comprising:
    a passive safety unit for protecting a passenger in a vehicle;
    an ignition circuit, connected to an on-board power source, for applying an operating current to said passive safety unit to actuate said passive safety unit;
    a backup capacitor, connected to the on-board power source and the ignition circuit, for applying the operating current to said passive safety unit when the ignition circuit is disconnected from the power source;

a control part, connected to the on-board power source and said backup capacitor, for controlling said ignition circuit; and a nonvolatile memory in which failure diagnosis information is stored, wherein first data and second data different from the first data are written as initial values in said nonvolatile memory, and wherein said control part has first means for comparing the first data with the second data and for judging the backup capacitor not to be working normally, when the on-board power source is turned on, if the first data coincides with the second data, the first means applying a predetermined processing to the first data to make the first data equal to the second data and writing the processed first data in said nonvolatile memory if the first data does not coincide with the second data; and second means for applying a predetermined processing to the second data after a predetermined time has and for writing the processed second data in said nonvolatile memory.

5. The passive safety device for a vehicle according to claim 4, wherein said predetermined time is shorter than an operating time of said control part defined by a discharge time of said backup capacitor when the backup capacitor is working normally, and is longer than an operating time of said control part defined by a discharge time of said backup capacitor when said backup capacitor is not working normally.

6. The passive safety device for a vehicle according to claim 4, wherein said first data and the second data have the same bit length, and wherein said first means and said second means shift said first data and said second data by a predetermined number of bits, respectively.

7. The passive safety device for a vehicle according to claim 6, wherein the initial value of said first data is equal to ½ the initial value of the second data, and wherein said predetermined number of bits is one.

8. The passive safety device for a vehicle according to claim 4, wherein said first data comprises a plurality of first comparing data and the second data comprises a plurality of second comparing data, and wherein said first means and said second means perform a predetermined processing for each of said first comparing data and said second comparing data, respectively, and wherein said first means compares each of said first comparing data and said second comparing data, and judges said backup capacitor not to be working normally if the comparison shows that the number of comparing data coincided with each other surpasses a predetermined number.

9. The passive safety device for a vehicle according to claim 4, wherein said first means judges the backup capacitor not to be working normally if said first data and said second data written in said nonvolatile memory coincide with each other as many as a predetermined number of times.

10. The passive safety device for a vehicle according to claim 4, wherein said predetermined time is determined by measuring an operating time of said control part, and is written in said nonvolatile memory.

* * * * *